United States Patent
Zhou et al.

(10) Patent No.: US 9,827,865 B2
(45) Date of Patent: Nov. 28, 2017

(54) SYSTEMS AND METHODS FOR RECHARGING VEHICLE-MOUNTED ENERGY STORAGE DEVICES

(71) Applicant: General Electric Company, Schenectady, NY (US)

(72) Inventors: Zhi Zhou, Selkirk, NY (US); Herman Lucas Norbet Wiegman, Niskayuna, NY (US); Irene Michelle Berry, Schenectady, NY (US); Lembit Salasoo, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/967,967

(22) Filed: Dec. 14, 2015

(65) Prior Publication Data
US 2016/0185243 A1 Jun. 30, 2016

Related U.S. Application Data

(60) Provisional application No. 62/097,942, filed on Dec. 30, 2014, provisional application No. 62/154,372, filed on Apr. 29, 2015.

(51) Int. Cl.
*H02J 7/00* (2006.01)
*B60L 11/00* (2006.01)
(Continued)

(52) U.S. Cl.
CPC ....... *B60L 11/1822* (2013.01); *B60L 11/1851* (2013.01); *B60S 5/06* (2013.01);
(Continued)

(58) Field of Classification Search
CPC ............. B60L 11/1822; B60S 5/06
(Continued)

(56) References Cited

U.S. PATENT DOCUMENTS 3,790,816 A 2/1974 Berman
4,102,273 A * 7/1978 Merkle ............... B60K 1/04
104/34

(Continued)

FOREIGN PATENT DOCUMENTS

CA 2784670 A1 7/2011
CN 102420447 A 4/2012
(Continued)

OTHER PUBLICATIONS

Lembit Salasoo, dated Apr. 29, 2015, U.S. Appl. No. 62/154,372.
(Continued)

*Primary Examiner* — M'Baye Diao
(74) *Attorney, Agent, or Firm* — Global Patent Operation; John A. Kramer

(57) ABSTRACT

A vehicle battery exchange system includes a base, a gripper, a retrieval actuator that retractably and extensibly connects the gripper to the base, and a vehicle alignment feature sensing apparatus that is operatively connected at least with the retrieval actuator and is configured to cause extension of the retrieval actuator to a battery-engaging position of the gripper in response to registration of a vehicle alignment feature to the vehicle alignment feature sensing apparatus, and to cause retraction of the retrieval actuator to a battery-removing position of the gripper in response to latching engagement of the gripper with a battery that is mounted in a vehicle at a pre-defined location relative to the vehicle alignment feature that is in registration to the alignment feature sensing apparatus.

20 Claims, 7 Drawing Sheets

(51) Int. Cl.
| | |
|---|---|
| *B61K 11/00* | (2006.01) |
| *B60R 16/04* | (2006.01) |
| *B60L 11/18* | (2006.01) |
| *B60S 5/06* | (2006.01) |
| *H01M 2/10* | (2006.01) |

(52) U.S. Cl.
CPC ...... *H01M 2/1083* (2013.01); *H01M 2220/20* (2013.01); *Y02T 90/124* (2013.01)

(58) Field of Classification Search
USPC .............. 320/109; 104/34; 701/22; 180/68.5
See application file for complete search history.

(56) References Cited

U.S. PATENT DOCUMENTS

| | | | |
|---|---|---|---|
| 4,272,716 A | 6/1981 | Etienne | |
| 4,342,533 A * | 8/1982 | Hane | B60K 1/04 104/34 |
| 4,983,903 A * | 1/1991 | Bae | B60K 1/04 104/34 |
| 5,091,687 A | 2/1992 | Meyer et al. | |
| 5,163,537 A | 11/1992 | Radev | |
| 5,318,142 A | 6/1994 | Bates et al. | |
| 5,360,307 A * | 11/1994 | Schemm | B60K 1/04 104/34 |
| 5,373,195 A | 12/1994 | De Doncker et al. | |
| 5,545,967 A | 8/1996 | Osborne et al. | |
| 5,594,318 A * | 1/1997 | Nor | B60L 11/1816 320/108 |
| 5,612,606 A * | 3/1997 | Guimarin | B60K 1/04 104/34 |
| 5,620,057 A | 4/1997 | Klemen et al. | |
| 5,659,237 A | 8/1997 | Divan et al. | |
| 5,659,240 A | 8/1997 | King | |
| 5,764,027 A | 6/1998 | Harvey | |
| 5,898,282 A | 4/1999 | Drozdz et al. | |
| 5,982,143 A | 11/1999 | Stuart | |
| 6,150,795 A | 11/2000 | Kutkut et al. | |
| 6,294,843 B1 | 9/2001 | Kato et al. | |
| 6,380,701 B1 | 4/2002 | Kahlon et al. | |
| 6,390,215 B1 | 5/2002 | Kodama et al. | |
| 6,841,971 B1 | 1/2005 | Spee et al. | |
| 6,973,880 B2 | 12/2005 | Kumar | |
| 7,004,710 B1 | 2/2006 | Quade | |
| 7,053,588 B2 | 5/2006 | Nakanishi et al. | |
| 7,061,131 B2 | 6/2006 | King et al. | |
| 7,448,328 B2 | 11/2008 | Kumar | |
| 7,602,143 B2 * | 10/2009 | Capizzo | B60K 15/063 104/34 |
| 7,715,958 B2 | 5/2010 | Kumar | |
| 7,854,203 B2 | 12/2010 | Kumar | |
| 7,893,658 B2 | 2/2011 | Bhardwaj | |
| 8,022,666 B2 * | 9/2011 | Li | B60L 11/185 104/34 |
| 8,025,474 B2 * | 9/2011 | Springston | B60S 5/06 104/34 |
| 8,047,317 B2 | 11/2011 | Mari Curbelo et al. | |
| 8,063,609 B2 | 11/2011 | Salasoo et al. | |
| 8,089,249 B2 | 1/2012 | Zhang et al. | |
| 8,148,952 B2 | 4/2012 | Schaffnit | |
| 8,253,378 B2 | 8/2012 | Lee et al. | |
| 8,487,582 B2 | 7/2013 | King et al. | |
| 8,643,334 B2 | 2/2014 | Kuo et al. | |
| 8,829,853 B2 * | 9/2014 | Hill | B60L 5/42 104/34 |
| 8,890,475 B1 | 11/2014 | Becker | |
| 8,952,662 B2 | 2/2015 | Ma | |
| 9,035,607 B2 | 5/2015 | Lafrance | |
| 9,037,334 B1 * | 5/2015 | Cole | B60W 10/06 701/22 |
| 9,142,979 B2 | 9/2015 | Tsai | |
| 9,174,525 B2 | 11/2015 | Caron | |
| 9,225,191 B2 | 12/2015 | Drobnik | |
| 2002/0145404 A1 * | 10/2002 | Dasgupta | H02J 7/0013 320/116 |
| 2004/0112320 A1 | 6/2004 | Bolz et al. | |
| 2005/0077875 A1 | 4/2005 | Bohley | |
| 2005/0077879 A1 | 4/2005 | Near | |
| 2006/0250902 A1 | 11/2006 | Bender et al. | |
| 2007/0051542 A1 | 3/2007 | Wilks | |
| 2007/0178771 A1 | 8/2007 | Goetz et al. | |
| 2008/0233469 A1 | 9/2008 | Drozdz et al. | |
| 2009/0058355 A1 | 3/2009 | Meyer | |
| 2010/0080030 A1 * | 4/2010 | Wiegman | B60L 11/1868 363/131 |
| 2010/0235030 A1 | 9/2010 | Xue et al. | |
| 2011/0044791 A1 * | 2/2011 | Agassi | B60K 1/04 414/806 |
| 2011/0089898 A1 | 4/2011 | Lee et al. | |
| 2011/0114398 A1 | 5/2011 | Bianco | |
| 2011/0123309 A1 * | 5/2011 | Berdelle-Hilge | B60K 1/04 414/800 |
| 2011/0193528 A1 | 8/2011 | Huggins | |
| 2011/0285352 A1 | 11/2011 | Lim et al. | |
| 2011/0301794 A1 | 12/2011 | Bastien | |
| 2012/0025784 A1 | 2/2012 | Rana | |
| 2012/0032638 A1 | 2/2012 | Jung | |
| 2012/0038216 A1 * | 2/2012 | Berry | B60L 11/005 307/77 |
| 2012/0119709 A1 | 5/2012 | Mull et al. | |
| 2012/0217806 A1 | 8/2012 | Heidenreich et al. | |
| 2012/0262110 A1 * | 10/2012 | Soong | H02J 7/04 320/109 |
| 2012/0271723 A1 | 10/2012 | Penilla et al. | |
| 2012/0286733 A1 | 11/2012 | Chang et al. | |
| 2012/0316671 A1 | 12/2012 | Hammerslag et al. | |
| 2013/0015817 A1 | 1/2013 | Wang et al. | |
| 2013/0049698 A1 | 2/2013 | Jung | |
| 2013/0057219 A1 | 3/2013 | Sakata | |
| 2013/0063072 A1 | 3/2013 | Shirasaka et al. | |
| 2013/0138279 A1 * | 5/2013 | Shi | B60L 1/00 701/22 |
| 2013/0177795 A1 | 7/2013 | Power et al. | |
| 2013/0214733 A1 | 8/2013 | Liang et al. | |
| 2013/0257145 A1 | 10/2013 | Caldeira et al. | |
| 2013/0282472 A1 | 10/2013 | Penilla et al. | |
| 2014/0266050 A1 | 9/2014 | Biskup | |
| 2015/0033537 A1 | 2/2015 | Poillot et al. | |

FOREIGN PATENT DOCUMENTS

| | | |
|---|---|---|
| CN | 102468674 A | 5/2012 |
| CN | 102664433 A | 9/2012 |
| CN | 102882242 A | 1/2013 |
| JP | 34334906 A | 11/1992 |
| JP | 2013247854 A | 12/2013 |
| WO | 2010076767 A1 | 7/2010 |
| WO | 2012154990 A2 | 11/2012 |

OTHER PUBLICATIONS

Lembit Salasoo, dated Dec. 11, 2015, U.S. Appl. No. 14/966,723.
Lembit Salasoo, dated Dec. 04, 2015, U.S. Appl. No. 14/959,424.
Ligong Wang et al., dated Jan. 17, 2014, U.S. Appl. No. 14/157,700.
Robert Dean King, dated Apr. 29, 2015, U.S. Appl. No. 14/699,173.
Robert Dean King et al., dated Dec. 16, 2015, U.S. Appl. No. 14/971,415.
Robert Dean King et al., dated Nov. 14, 2014, U.S. Appl. No. 14/541,529.
Saijun Mao et al., dated Jul. 2, 2014, U.S. Appl. No. 14/321,935.
Yarlagadda et al., "A Battery Management System Using an Active Charge Equalization Technique Based on DC-DC Converter Topology", Thesis, Master of Science in Engineering, University of Akron, pp. 1-143, Aug. 2011.
Einhorn et al., "Charge Balancing of Serially Connected Lithium-Ion Battery Cells in Electric Vehicles", E & i Electrical Engineering and Information Technology, pp. 167-173, vol. No. 129, Issue No. 3, May 2012.
US Non-Final Office Action issued in connection with Related U.S. Appl. No. 14/157,700 dated Jul. 24, 2015.

(56) References Cited

OTHER PUBLICATIONS

US Non-Final Office Action issued in connection with Related U.S. Appl. No. 14/321,935 dated Feb. 26, 2016.
Chinese Office Action issued in connection with Related CN Application No. 201310331899.0 dated Mar. 2, 2016.
European Search Report and Opinion issued in connection with Related EP Application No. 15194773.6 dated Jul. 7, 2016.
US Non-Final Office Action issued in connection with Related U.S. Appl. No. 14/541,529 dated Jul. 15, 2016.
US Notice of Allowance Office Action issued in connection with Related U.S. Appl. No. 14/321,935 dated Jul. 20, 2016.
US Final Office Action issued in connection with Related U.S. Appl. No. 14/157,700 dated Aug. 4, 2016.
US Notice of Allowance Office Action issued in connection with Related U.S. Appl. No. 14/971,415 dated Oct. 5, 2016.
US Non-Final Office Action issued in connection with Related U.S. Appl. No. 14/699,173 dated Nov. 22, 2016.
US Non-Final Office Action issued in connection with Related U.S. Appl. No. 14/541,529 dated Jan. 12, 2017.

\* cited by examiner

SYSTEMS AND METHODS FOR RECHARGING VEHICLE-MOUNTED ENERGY STORAGE DEVICES

CROSS-REFERENCE TO RELATED APPLICATIONS

This application claims priority to U.S. Provisional Application No. 62/097,942 filed Dec. 30, 2014 and to U.S. Provisional Application No. 62/154,372 filed Apr. 29, 2015, both of which are incorporated by reference herein in their entireties.

BACKGROUND

Technical Field

Embodiments of the invention relate generally to vehicles powered from replaceable energy storage devices. Particular embodiments relate to battery-powered electric vehicles.

Discussion of Art

Generally, vehicles that are not continuously powered from an external source incorporate some kind of energy storage apparatus, e.g., a battery or fuel tank, which requires periodic recharging or refilling. In the context of work vehicles (e.g., a mine vehicle, a rail locomotive, or other off-highway vehicle/OHV), however, it is generally desirable to reduce or substantially eliminate the downtime required for recharging or refilling a battery or fuel tank. For example, it may be desirable for a battery powered electric vehicle to have provided a battery exchange apparatus for quickly removing an expended battery and replacing it with a fully charged battery. For such an apparatus it may be necessary for the vehicle to be positioned at a particular exchange position to enable removal and replacement of batteries, etc.

In certain work environments, however, there may be restrictions on where batteries can be exchanged. For example, underground gallery mining operations can extend as deep as two miles vertically and for many miles horizontally into the ground. Although elevators in vertical shafts may be used for lifting ore up from the sub-levels of a mine, it is prohibitively expensive to put vertical shafts all along a miles-long gallery. Accordingly, vehicles are used to haul the ore along the galleries to the extraction shafts. As ventilation of underground mines already is a challenging task, it is desirable for such vehicles to have minimal emissions. Presently, some ore haulers are built with engines certified to "Tier 3" emissions standards. It would be more desirable to build these hauler vehicles as zero-emissions vehicles, e.g., powered by stored energy, so as to avoid any additional ventilation loading from their operation. Recharging the batteries of such vehicles, however, is potentially problematic. For cost reasons, battery-charging stations can be provided only in selected areas of a mining operation, typically close to an extraction shaft.

Electric powered vehicles are currently used for crew transport within mines. Because crew transport is a relatively low-repetition event (typically, one inbound trip and one outbound trip per shift), a battery powered crew transport vehicle often is able to sit at a charging station throughout a shift. This relatively high availability for charging enables use of charging stations with relatively low power draw and thereby reduces the equipment and operational costs of recharging battery powered crew transport vehicles.

In contrast to crew transport vehicles, mine operations typically have ore hauler vehicles in near-continuous motion, pausing only to load and unload. Loading locations are continuously moving as the work face advances or retreats, and it is not feasible to keep relocating battery-charging stations at loading locations. Although unloading locations are fixed (adjacent the conveyors that travel up the extraction shafts) during unloading, an ore hauler vehicle is subject to large and somewhat unpredictable mechanical loads. Additionally, each ore hauler vehicle is scheduled to clear loading and unloading locations as rapidly as possible so that a next ore hauler can begin to load or dump. As will be appreciated, the high capacity batteries essential to powering an ore hauler, which must transport loads far heavier than a few crew members, would take too long to recharge at these locations even at relatively high electrical power (e.g., on the order of thousands of watts).

For at least these reasons, loading and unloading locations are not optimal locations for recharging an ore hauler vehicle battery. Accordingly, use of battery powered ore hauler vehicles would likely require scheduling an additional stop or sidetrack along the haul route to permit for battery recharge in a location away from loading, hauling, and unloading operations. Sidetracking an ore hauler, however, results in excessive time in which the hauler is not loading, hauling, and unloading. This excessive off-task time has been an obstacle to adoption of battery powered hauler vehicles, which otherwise would be desirable at least because they would reduce the ventilation loading in deep galleries. Another hurdle to adoption has been the cost of energy storage devices capable to support hours of operation along with rapid full charging.

Therefore, it may be desirable to provide systems and methods for recharging vehicle-mounted energy storage devices that differ from currently available systems and methods, for example, to enable opportunity (partial) charging of vehicle-mounted energy storage devices and/or to enable battery exchange without having to bring a vehicle to a particular battery exchange location.

BRIEF DESCRIPTION

In an embodiment, a system (e.g., vehicle battery exchange system) includes a base, a gripper, a retrieval actuator that retractably and extensibly connects the gripper to the base, and a vehicle alignment feature sensing apparatus that is operatively connected at least with the retrieval actuator. The vehicle alignment feature sensing apparatus is configured to cause extension of the retrieval actuator to a battery-engaging position of the gripper in response to registration of a vehicle alignment feature to the vehicle alignment feature sensing apparatus, and to cause retraction of the retrieval actuator to a battery-removing position of the gripper in response to latching engagement of the gripper with a battery that is mounted in a vehicle at a pre-defined location relative to the vehicle alignment feature that is in registration to the alignment feature sensing apparatus.

In an embodiment, a system (e.g., vehicle battery exchange system) includes a vehicle alignment feature, a battery receptacle that is mounted at a pre-defined position relative to the vehicle alignment feature, and a power connector that is mounted to the battery receptacle for operative connection to a battery by receipt of the battery into the battery receptacle.

In an embodiment, a system (e.g., vehicle battery exchange system) includes a battery and a catch unit that is incorporated into the battery and that is configured to secure the battery into a battery receptacle in response to insertion of the battery into the battery receptacle. The catch unit is also configured to release the battery from the battery receptacle in response to receipt of a release signal.

In an embodiment, a method includes moving a vehicle adjacent to a battery exchange apparatus. The vehicle includes a vehicle alignment feature and including a battery mounted at a pre-defined position relative to the vehicle alignment feature, and the battery exchange apparatus includes an alignment feature sensing apparatus. The method further includes providing a ready signal from the alignment feature sensing apparatus when the vehicle alignment feature is in registration with the alignment feature sensing apparatus, and actuating the battery exchange apparatus to remove the battery from the vehicle in response to the ready signal.

In an embodiment, a system (e.g., a vehicle battery/charging system) includes an energy management module, a first rechargeable energy storage device configured for mounting to a vehicle body of a vehicle having a motor and connecting to supply power to the vehicle via the energy management module, and a second energy storage device configured for mounting to the vehicle body and connecting to supply power to the vehicle via the energy management module. The energy management module is configured for mounting to the vehicle body and to power the vehicle including the motor from the first rechargeable energy storage device during execution of a routine operation, and from the second energy storage device in a first mode during recharging of the first rechargeable energy storage device and in a second mode during execution of a non-routine operation.

In an embodiment, a system (e.g., a vehicle battery/charging system) includes a vehicle body, a motor mounted to the vehicle body, a first rechargeable energy storage device mounted to the vehicle body and connected to supply power to the vehicle via an energy management module, and a second energy storage device mounted to the vehicle body and connected to supply power to the vehicle via the energy management module. The energy management module is mounted to the vehicle body and connected and configured to power the vehicle including the motor from the first rechargeable energy storage device during execution of a routine operation and from the second energy storage device during a first mode of recharging of the first rechargeable energy storage device and a second mode during execution of a non-routine operation.

In an embodiment, a method includes selecting a route for a vehicle, operating the vehicle along the route from a rechargeable battery if the selected route includes an opportunity charging station, selecting a next route that does include an opportunity charging station if the selected route does not include an opportunity charging station, and operating the vehicle along the selected route from a swappable battery in the event that (i) the selected route does not include an opportunity charging station and (ii) there is no selectable next route that includes an opportunity charging station.

DRAWINGS

The present invention will be better understood from reading the following description of non-limiting embodiments, with reference to the attached drawings, wherein below:

DETAILED DESCRIPTION

Figure 1:
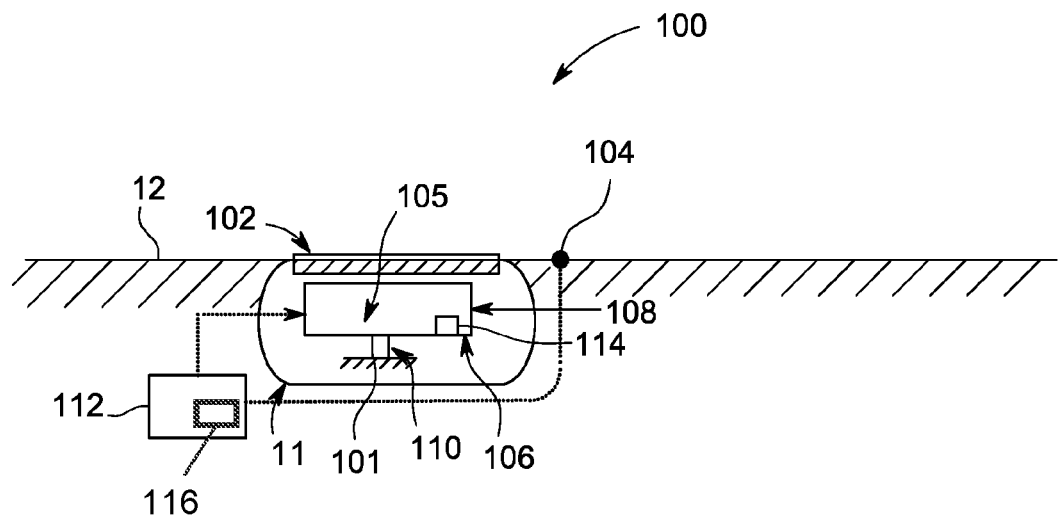
FIG. 1 is a schematic view of a pit-mounted battery exchange system or apparatus according to a first embodiment of the invention.

Reference will be made below in detail to exemplary embodiments of the invention, examples of which are illustrated in the accompanying drawings. Wherever possible, the same reference characters used throughout the drawings refer to the same or like parts, without duplicative description.

Embodiments of the invention are intended to provide for ease of battery exchange during operation of vehicles powered by batteries. Although exemplary embodiments are described with respect to electric vehicles, embodiments of the invention also are applicable for use with any sort of vehicle powered from a replaceable energy storage device (e.g., air cylinders, gas bottles). Embodiments of the invention may also be suitable for use with self-guided or automated vehicles. As used herein, a "zero-emissions" vehicle is one that during its operation does not reduce the availability of breathable air in its vicinity, whereas a "hybrid" vehicle is a vehicle provided both with a "secondary" energy storage device (e.g., an energy storage device that is easily rechargeable) as well as a "primary" chemical energy production device (e.g., a combustion engine).

As used herein, the terms "substantially," "generally," and "about" indicate conditions within reasonably achievable manufacturing and assembly tolerances, relative to ideal desired conditions suitable for achieving the functional purpose of a component or assembly.

Figure 2:
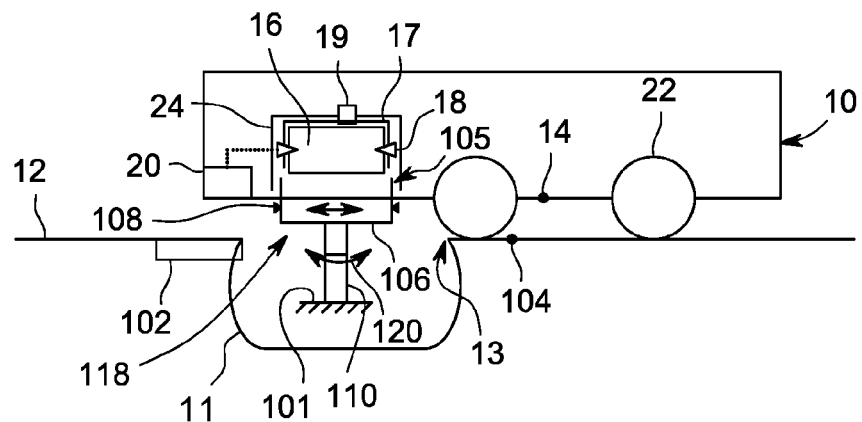
FIGS. 2-3 show operation of the battery exchange system of FIG. 1.
Figure 3:
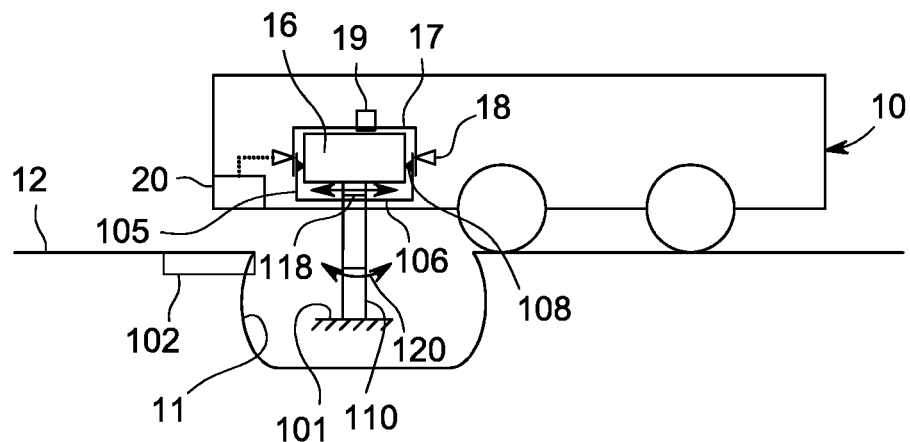

FIG. 1 shows schematically a pit-mounted battery exchange apparatus or system 100 according to a first embodiment of the invention. The pit-mounted battery exchange system interacts with a stored energy vehicle 10 (e.g., electric vehicle) as generally shown in FIGS. 2-3. The system 100 is mounted on a base 101 within a pit (or other housing) 11 that is disposed beneath the transit surface 12 of a track, road, or pathway that the vehicle 10 transits. The system 100 includes a retractable cover 102 that is movable to open or close a retrieval opening 13 (i.e., the top of the pit), a vehicle alignment feature sensing apparatus 104, a gripper 105, and a retrieval actuator 110. The gripper 105 includes a battery (e.g., energy storage cartridge) retrieval platform 106, as well as a battery (e.g., energy storage cartridge) latch unit 108 that protrudes from the platform 106. The retrieval actuator 110 is arranged to extend the gripper 105 out of the pit 11 in synchrony with retraction of the cover 102, and to keep the gripper 105 within the pit when the cover 102 is extended to cover the pit. The vehicle alignment feature sensing apparatus 104 is operatively connected with other components of the battery exchange apparatus 100, including for example the cover 102, the gripper 105, and the retrieval actuator 110. For example, the vehicle alignment feature sensing apparatus 104 may include a controller 112, or be operatively connected with other components of the pit-mounted battery exchange system via a controller. As used herein, "vehicle alignment feature" refers to a distinct marking or surface form that is distinguishable from surrounding structures.

The system 100 is configured to interact with the vehicle 10 via actuation of the vehicle alignment feature sensing apparatus 104 by a vehicle alignment feature 14, which is disposed on the vehicle 10. The vehicle 10 also includes a battery (e.g., energy storage cartridge) 16, which is removably mounted therein or thereon at a predetermined location (e.g., in a battery receptacle 17) relative to the vehicle alignment feature 14. Additionally, the vehicle 10 may include a vehicle battery catch unit 18, which holds the battery in place within or on the vehicle; a power connector 19, which is mounted to the battery receptacle 17 for operative connection to the battery 16 by receipt of the battery into the battery receptacle; and/or a battery catch controller 20, which may operate the vehicle battery catch unit 18 in response to command signals. In this context command signals may include, e.g., provision of power from the battery 16 to the power connector 19, and/or actuation of a contact sensor 114 by engagement of the gripper 105 against the first surface of the battery 16.

In certain embodiments, the vehicle battery catch unit 18 may be a self-operating device, e.g., a mechanical or electromechanical device, which is actuated to automatically secure the battery 16 upon receipt of the battery into the battery receptacle 17, or upon provision of power from the battery 16 to the power connector 19, and to release the battery 16 in response to engagement of the gripper 105 against the first surface of the battery. In certain embodiments, the battery catch unit 18 may be integrated into the battery 16 for securing the battery into the battery receptacle 17. In such case the battery receptacle 17 may include a detent for engagement by the battery-mounted catch unit 18.

The power connector 19 may be disposed within the battery receptacle 17 such that the power connector 19 protrudes toward an insertion opening 21 of the battery receptacle 17, in order that a battery 16 that is inserted into the receptacle automatically will become operatively connected to the power connector 19.

In other embodiments, the vehicle alignment feature sensing apparatus 104 may be disposed on the vehicle 10 at a predetermined location relative to the battery 16, with the vehicle alignment feature 14 being disposed on the track surface 12 or on another surface at a predetermined location relative to the gripper 105. In this case, the vehicle alignment feature sensing apparatus 104 can be operatively connected with the other components of the battery exchange apparatus 100 via wireless communication with, e.g., the controller 112. Multiple vehicle alignment feature sensing apparatuses may be consecutively wirelessly connected with the controller 112, as different vehicles 10 transit near the battery exchange apparatus 100.

In operation, as shown at FIGS. 2-3, the vehicle alignment feature 14 comes into registration (pre-determined location or pathway) relative to the vehicle alignment feature sensing apparatus 104. The vehicle alignment feature sensing apparatus 104 accordingly detects the vehicle alignment feature 14. In response to detecting the vehicle alignment feature, the vehicle alignment feature sensing apparatus 104 causes retraction of the cover 102, e.g., by direct control of a cover motor (not shown), or by signaling the controller 112 to retract the cover. The vehicle alignment feature sensing apparatus also causes extension of the retrieval actuator 110, e.g., by direct control of the retrieval actuator, or by signaling the controller 112 to operate the retrieval actuator. Extension of the retrieval actuator 110 engages the battery retrieval platform 106 against the battery 16. Concurrently, the controller 112 may send to the battery catch controller 20 a command signal (e.g., battery-engaging signal) to unlatch or release the vehicle battery catch unit 18.

After detecting contact of the battery retrieval platform 106 against a first surface of the battery 16 (e.g., by actuation of a contact sensor 114) in order to confirm that the gripper 105 has reached a battery-engaging position (as shown in FIG. 3), and optionally after receiving from the battery catch controller 20 an acknowledgement of the battery-engaging signal, the system 100 actuates the battery latch unit 108 to latchingly engage a second surface of the battery 16. For example, the battery latch unit 108 may be actuated by a signal directly from the contact sensor 114 or from the retrieval actuator 110 (e.g., a fully extended stop limit signal) or indirectly via the controller 112. The battery latch unit 108 may engage the same surface or features that are engaged by the battery catch unit 18. Alternatively, the battery latch unit 108 may engage a different surface or features than those that are engaged by the battery catch unit 18.

Once the battery latch unit 108 has latchingly engaged the gripper 105 with the battery 16, then the battery exchange system 100 retracts the gripper 105 to a battery-removing position within the pit 11 (as shown in FIG. 1), e.g., by the battery latch unit 108 directly actuating the retrieval actuator 110, or by the battery latch unit 108 indirectly signaling to the controller 112 to operate the retrieval actuator 110. For example, the battery latch unit 108 may be equipped with a contact sensor (not shown) that actuates the retrieval actuator 110 when the battery latch unit has fully engaged the battery 16.

According to certain aspects of the invention, the battery exchange apparatus controller 112 may be configured with a transponder 116 for communicating with a traction system 22 of the vehicle 10. For example, the controller 112 may be configured to send a ready signal to the vehicle traction system 22 when the retrieval actuator 110 begins to extend to its battery-engaging position. In response to such ready signal, the vehicle traction system 22 may maintain a constant (e.g., zero, or non-zero) velocity while the retrieval actuator extends. The controller 112 may be further configured to send a completion signal to the vehicle traction control system 22 for permitting vehicle acceleration when the retrieval actuator 110 has been withdrawn or retracted to its battery-removing position.

As further shown in FIG. 2, the retrieval actuator 110 may incorporate at least one of a lateral actuator 118 for moving the gripper 105 along a direction perpendicular to the extension and retraction of the retrieval actuator 110, and/or a swivel actuator 120 for rotating the gripper 105 around an axis parallel to the extension and retraction of the retrieval actuator 110. Thus, the vehicle alignment feature sensing apparatus 104 (or the controller 112) may be operatively connected to adjust the lateral actuator and/or the swivel actuator according to respective lateral and/or angular misalignment of the vehicle alignment feature 14 from the vehicle alignment feature sensing apparatus 104. For example, in case the vehicle alignment feature sensing apparatus 104 might be mounted on the gripper 105, then the controller 112 may adjust the lateral and/or swivel actuators until an appearance of the vehicle alignment feature 14, to the vehicle alignment feature sensing apparatus 104, approximates a target appearance configured in the controller 112.

It could be understood from FIGS. 2-3 that the vehicle 10 travels across the drawing views, i.e., left to right or right to left, and halts or pauses adjacent the battery exchange system 100 in order for the gripper 105 to engage and retrieve the battery 16 from a compartment or indentation 24. However, in case the intent is to remove and replace the battery 16 while the vehicle 10 continues in motion at a non-zero (optionally, constant) velocity, then it may be considered that the vehicle 10 travels into or out of the drawing views so that as the gripper 105 engages with the battery 16, both the gripper and the battery transit along a groove 24 that is formed in the vehicle along the vehicle's direction of motion. In other words, the compartment or indentation 24 may be elongated for facilitating battery exchange during vehicle movement at a non-zero velocity.

Figure 4:
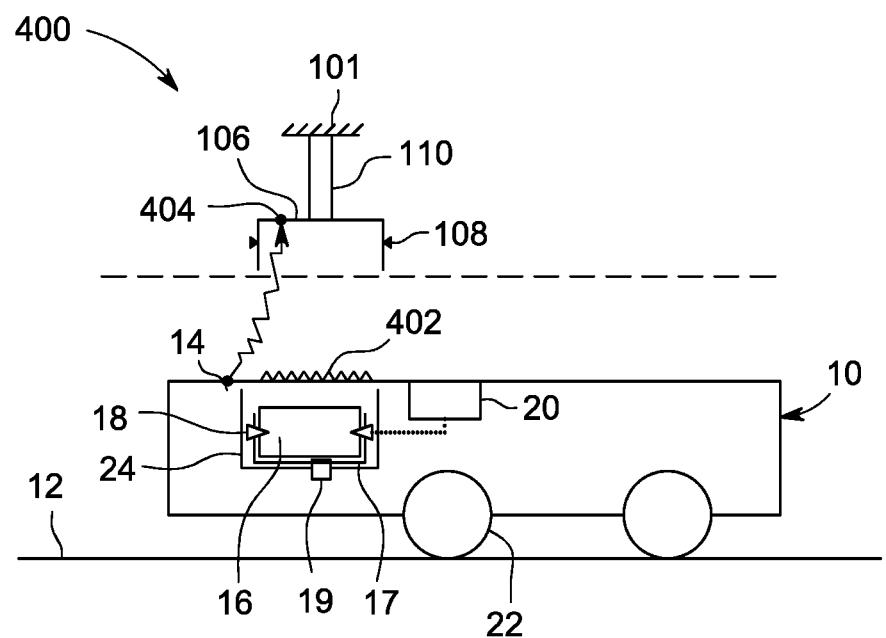
FIG. 4 is a schematic view of a ceiling-mounted battery exchange system according to an embodiment.
Figure 5:
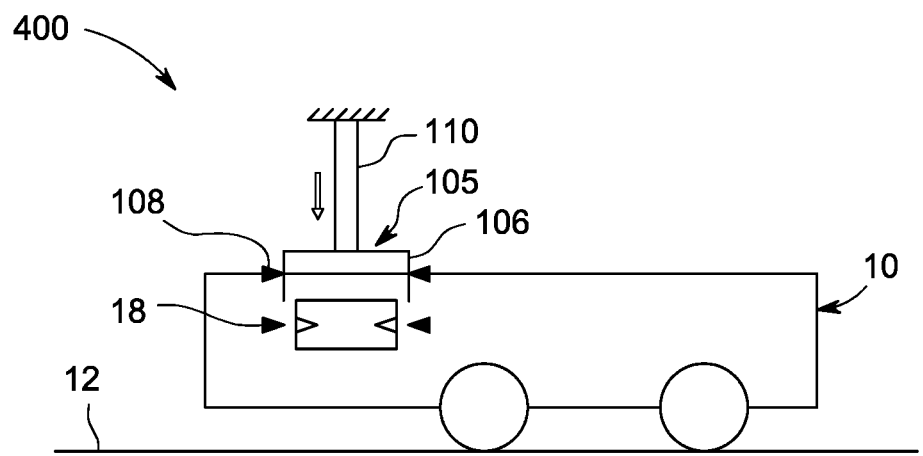
FIGS. 5-6 show operation of the battery exchange system of FIG. 4.
Figure 6:
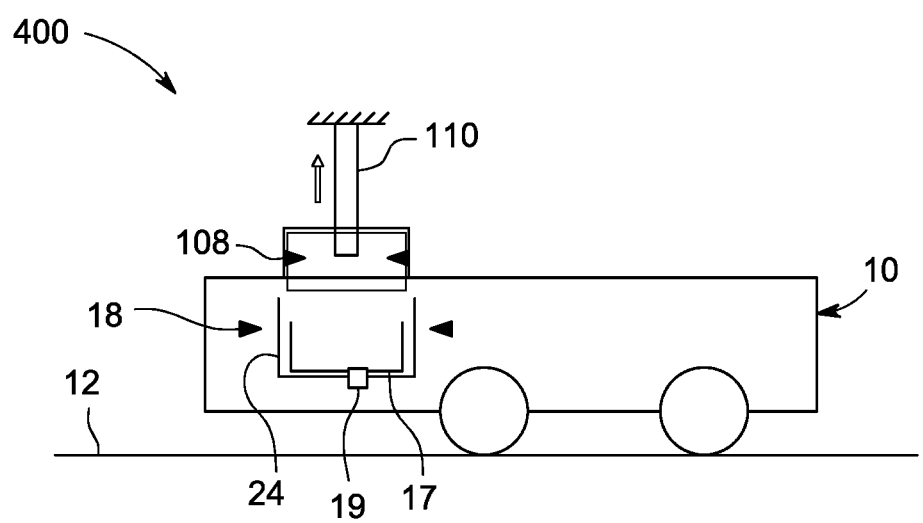

In contrast to the pit-mounted battery exchange system 100, FIG. 4 shows schematically a ceiling-mounted battery exchange system 400 according to a second embodiment of the invention. The system 400 includes a gripper 105, which is ceiling-mounted by way of a retrieval actuator 110. The gripper 105 mounts a vehicle alignment feature sensing apparatus 404. The gripper comprises a platform 106 as well as a latch unit 108. In operation, a vehicle 10 approaches under the ceiling-mounted battery exchange apparatus 400 along a pre-defined pathway that brings a vehicle alignment feature 14 into range or view of the vehicle alignment feature sensing apparatus 404. The vehicle alignment feature sensing apparatus 404 then activates the ceiling-mounted battery exchange system 400, and, optionally, signals to the vehicle to retract a battery compartment cover 402. In response to activation, the ceiling-mounted battery exchange apparatus 400 extends the retrieval actuator 110 in order to engage the gripper 105 with a battery 16 that is held in a receptacle 17, which is disposed in a compartment or groove 24 that is formed at an upper surface of the vehicle 10. Generally, operation of the ceiling-mounted battery exchange system 400 (as shown in FIGS. 5-6) proceeds substantially similarly to operation of the pit-mounted battery exchange system 100 as discussed above with reference to FIGS. 1-3.

Figure 7:
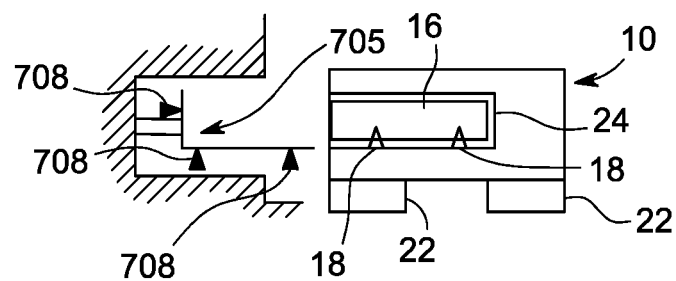
FIGS. 7-8 are schematic views of a wall-mounted battery exchange system and its operation according to an embodiment.
Figure 8:
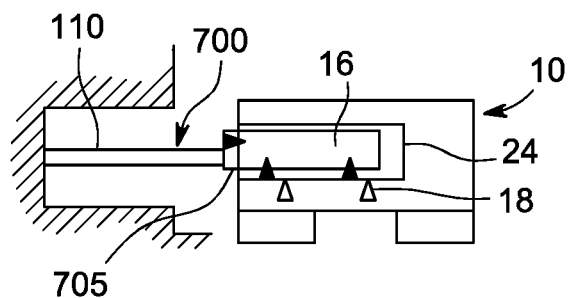

FIGS. 7-8 show schematically a wall-mounted (horizontally operating) battery exchange system 700 and its operation according to a third embodiment of the invention. The horizontally-operating battery exchange apparatus 700 has a gripper 705 that incorporates battery latch units 708 at two generally orthogonal surfaces of the gripper. It is otherwise similar to the embodiments shown at FIGS. 1-6.

Figure 9:
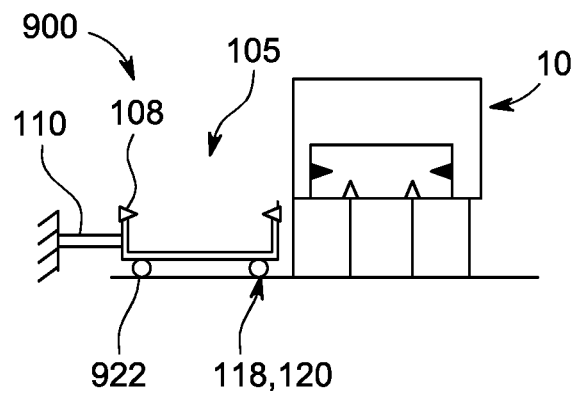
FIGS. 9-10 are schematic views of embodiments of a battery exchange system.
Figure 10:
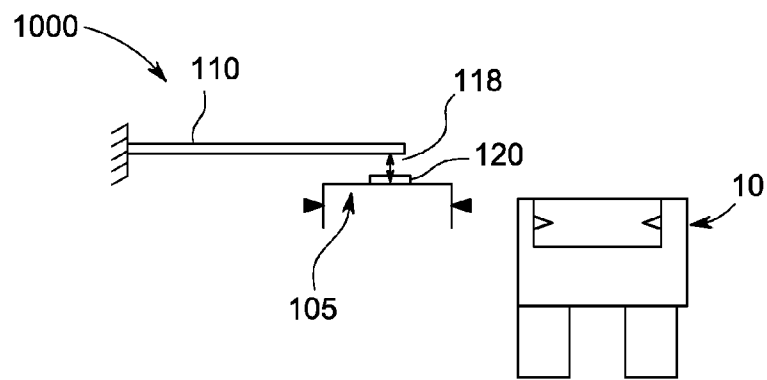

FIGS. 9 and 10 show schematically variants 900, 1000 of the battery exchange system 700. The floor-traveling system 900 has wheels or rollers 922 that can support or additionally drive the motion of the gripper 105. For example, the rollers 922 can act as lateral and swiveling actuators 118, 120 together with the retrieval actuator 110. The over-traveling system 1000 uses the retrieval actuator 110 in combination with a lateral actuator 118 that lowers and raises the gripper 105 for retrieving a battery 16 from a vehicle 10. The over-traveling system 1000 also incorporates a swiveling actuator 120.

Figure 11:
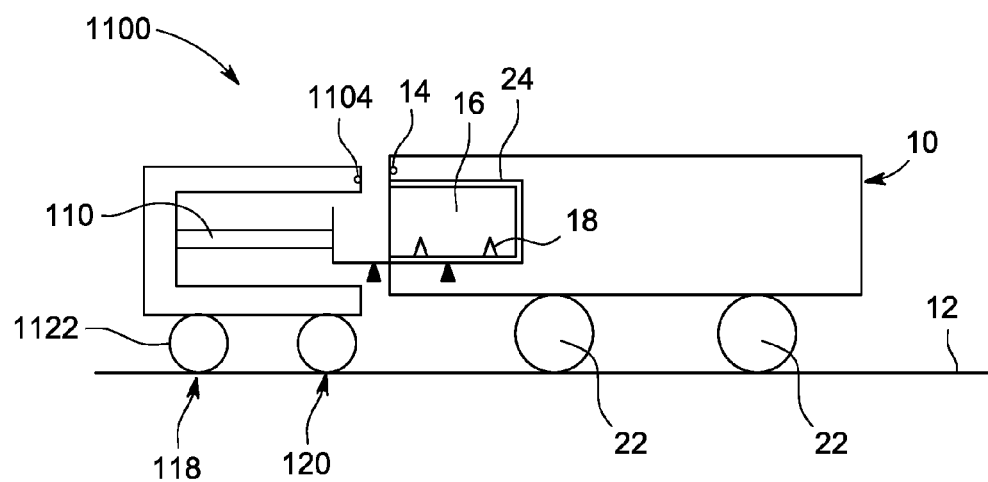
FIG. 11 is a schematic view of a battery exchange chase system according to an embodiment.

FIG. 11 shows schematically a battery exchange chase system 1100 according to another embodiment of the invention. The battery exchange chase apparatus 1100 includes a vehicle alignment feature sensing apparatus 1104 that uses the vehicle alignment features 14 as a fiducial surface for aligning the chase apparatus 1100 to a rearward battery opening of the vehicle 10, substantially as described in co-pending and commonly owned U.S. patent application Ser. No. 14/966,723 for "Methods and Apparatus for Automated Positioning of a Vehicle", hereby incorporated herein by reference in its entirety. Wheels 1122 of the chase vehicle 1100 can act as lateral and swivel actuators 118, 120, substantially as described in the aforementioned application. An aspect of the invention is that the chase apparatus 1100 enables exchange of a battery 16 while the vehicle 10 continues in motion toward its next worksite or dumpsite.

Figure 12:
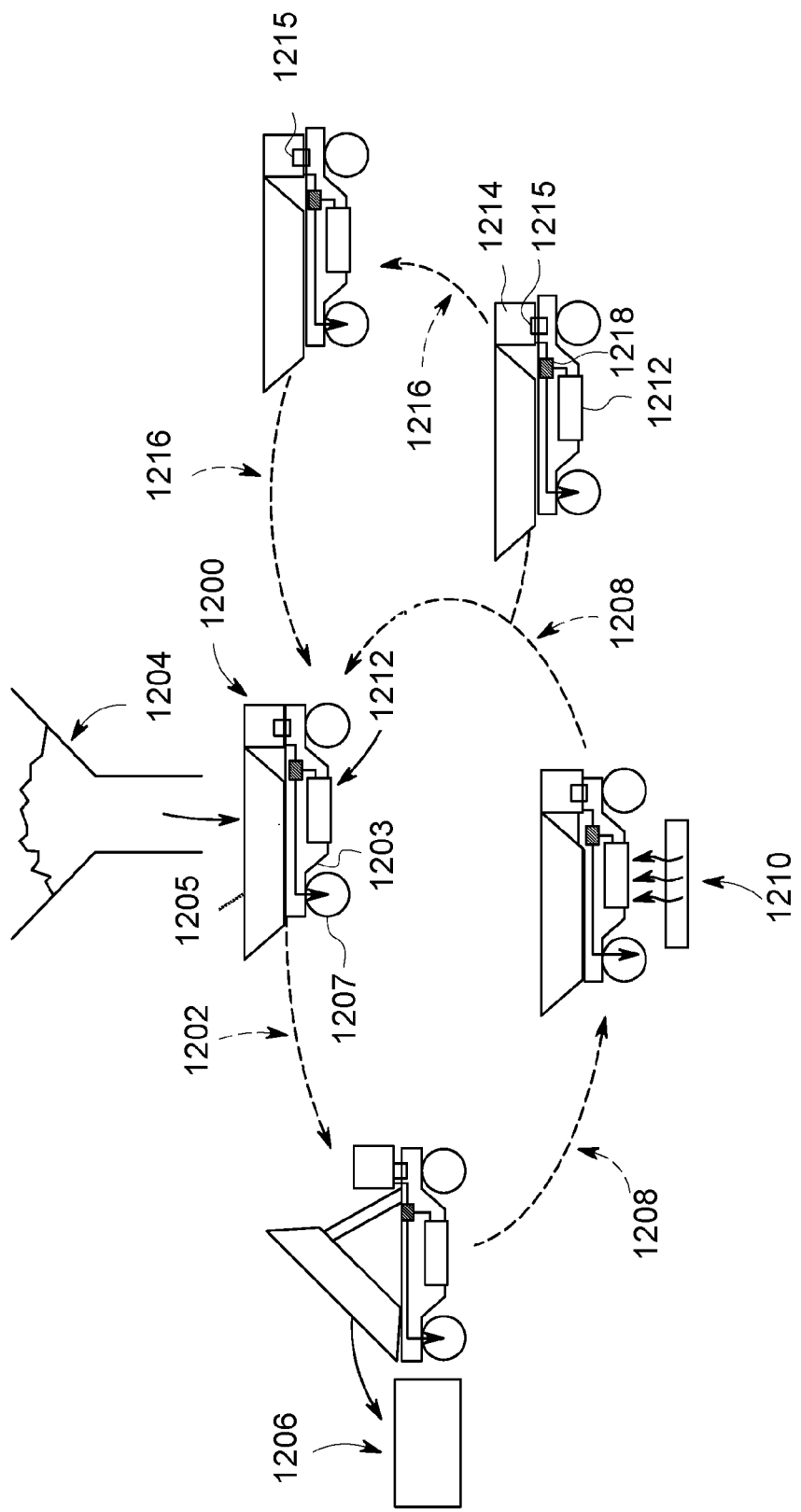
FIG. 12 is a schematic view of a system for recharging vehicle-mounted energy storage devices.
Figure 13:
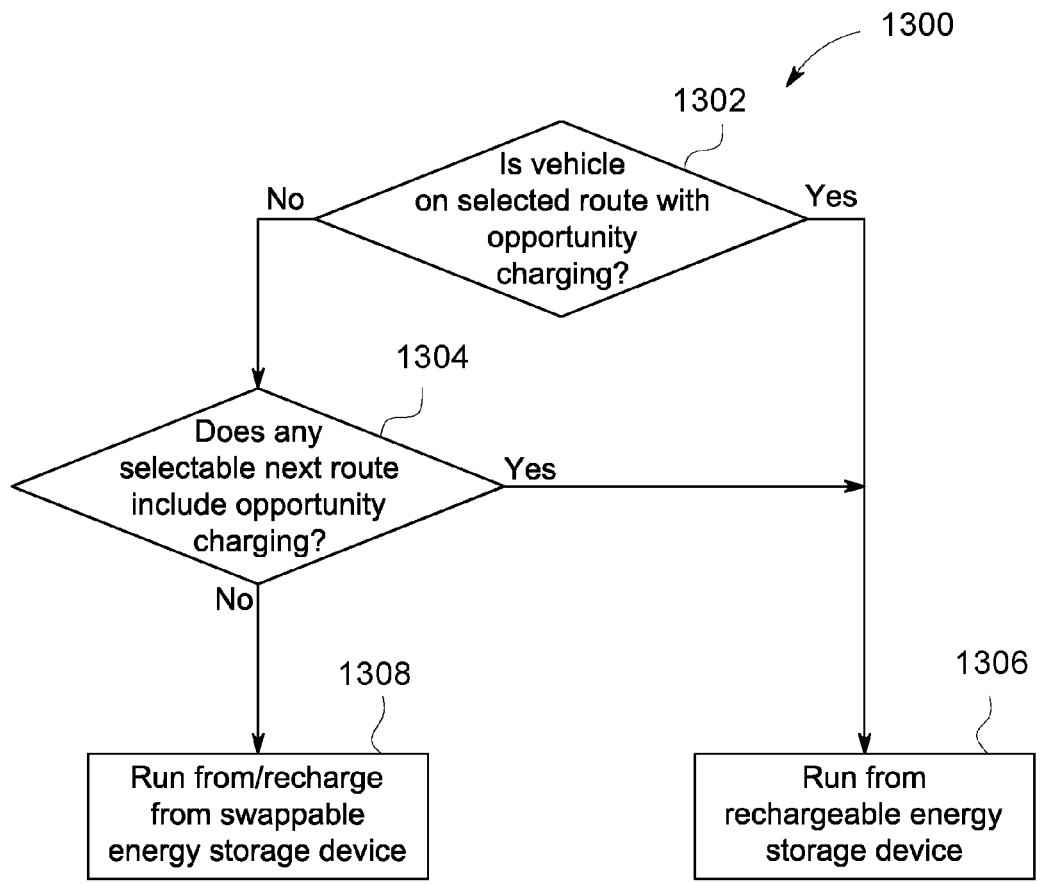
FIG. 13 is a flow chart illustrating an embodiment of a method for determining how to power a vehicle from vehicle-mounted energy storage devices.

FIGS. 12-13 are directed to vehicle systems and control methods, which may be utilized in conjunction with one or more of the battery exchange systems or methods of FIGS. 1-11. For example, in an embodiment, a system (e.g., a vehicle battery/charging system) includes an energy management module, a first, rechargeable energy storage device, and a second energy storage device, all of which are configured for mounting to the body (i.e., chassis) of the vehicle. The vehicle includes an electric motor, and the first and second energy storage devices are configured to supply power to the vehicle (e.g., for powering the motor to move the vehicle) through the energy management module. The energy management module is configured to power the vehicle (including the motor) from the first rechargeable energy storage device during execution of a routine operation, and from the second energy storage device, in a first mode of operation, during recharging of the first rechargeable energy storage device and, in a second mode of operation, during execution of a non-routine operation. The first, rechargeable energy storage device may be configured for opportunity (e.g., quick or partial, and/or in-transit) charging, whereas the second energy storage device may be configured for rapid exchange or swapping, using one or more of the systems of methods of FIGS. 1-11. In this manner, there is little or no downtime during routine operations, and less impact on vehicle cycle time overall due to battery swapping, since exchange of the second energy storage device occurs during non-routine operations. Also, since opportunity charging is used as the main charging method, this reduces the required energy storage size (e.g., weight and/or volume), which helps reduce the vehicle size in a confined mining space, for example.

As used herein, in one aspect, a routine operation is one that involves greater than 50% of a vehicle's duty cycle, whereas a non-routine operation is one that involves less than 50% of a vehicle's duty cycle. In another aspect, a routine operation may be one that involves greater than 75% of a vehicle's duty cycle, whereas a non-routine operation is one that involves less than 25% of a vehicle's duty cycle. In another aspect, a routine operation is one that involves at least 90% of a vehicle's duty cycle, whereas a non-routine operation is one that involves no more than 10% of a vehicle's duty cycle.

Embodiments relate to electric material/people transport vehicles (e.g., ore haulers and/or crew transports) that contain two or more energy storage devices/systems of same or different types, e.g., same type but two separate modules, or two different type (high power density vs. high energy density), or one battery module and one ultracapacitor module, etc. An ultracapacitor or supercapacitor has energy density on the order of tens to thousands of times higher than electrolytic and dielectric capacitors and with power density on the order of tens to hundreds of times higher than electrochemical batteries. For example, certain embodiments may employ ultracapacitors with gravimetric energy densities or specific energy in excess of 6 Wh/kg.

A first energy storage device (e.g., a smaller energy storage device with high power density) will be frequently discharged and recharged by opportunity charging, whereas a second energy storage device (e.g., a larger energy storage device with high energy density) will be discharged to its design low state of charge, then swapped/exchanged with a fully charged replacement energy storage device. (As should be appreciated, the second energy storage device may also be rechargeable, although in embodiments where the second energy storage device is rechargeable, it has different charging characteristics than the first energy storage device, e.g., it may take a longer time to fully charge.) Examples of suitable first (e.g., rapidly rechargeable) energy storage devices include electrochemical batteries, ultracapacitors, etc. Examples of suitable second (e.g., replaceable/swappable) energy storage devices include metal-air batteries, fuel cells, etc. For a repetitive route with routine loading, only the first energy storage device will be utilized. The opportunity charging of the first energy storage device in this use case will be simple and deterministic. On the other hand, for a variable route and variable loading conditions, opportunity charging of the first energy storage device may be adaptive/on-demand, and the second energy storage device can be utilized to fill energy gaps in case the opportunity charging is not able to provide the full energy and power required for the non-routine (e.g., atypical or variable) cycle or mission.

In an embodiment, as shown in FIG. 12, a vehicle 1200 travels a route 1202 from a loading site 1204 (e.g., where a vehicle such as an ore hauler receives ore in its bed 1205, or where a personnel carrier receives crew on its body 1203) to an unloading site 1206 (e.g., where the ore hauler dumps its bed 1205), and then travels a return route 1208 back to the loading site. Tractive effort for the vehicle 1200 is provided by a zero-emission motor 1207 (e.g., electric motor) that is mounted to the vehicle body 1203 and powered from the energy storage devices. Somewhere along the route 1202 and/or the return route 1208 (which, typically, may run along separate but adjoining travel lanes) there is an opportunity charging station 1210. The opportunity charging station 1210 can include a parked charging apparatus (by which the vehicle 1200 will be connected to a power supply by a plug-and-cable or plug-and-hose or other arrangement that requires the vehicle 1200 to stop moving) and/or a "mobile" charging apparatus. Mobile charging apparatuses can include, for example, a catenary/brush apparatus; an inductive charging apparatus; and/or a powered rail/roller apparatus, or any other apparatus that permits transfer of electrical energy from a fixed supply point to the vehicle while the vehicle moves through the opportunity charging station. Indeed, in case the vehicle 1200 incorporates regenerative braking, then a mobile charging apparatus can be considered to include any downhill portion of the routes 1202, 1208.

The vehicle 1200 is configured to be powered by a first energy storage device 1212 and/or by a second energy storage device 1214. According to aspects of the invention, the first energy storage device 1212 is utilized as the main energy storage that provides power and energy source during the routine operation of the vehicle. The first energy storage device 1212 has high power density so that it can be charged opportunistically at the one or more opportunity charging stations 1210 along the route 102 and/or the return route 1208. The energy storage device 1212 is designed to minimize weight and/or volume (and, in embodiments, cost) for providing sufficient power and energy to finish (at least) one cycle along the route 1202 and the return route 1208. Thus, the energy storage device 1212 is sized to power the vehicle 1200 along the entirety of the route 1202 and the return route 1208, and typically is a high power density type of energy storage device, e.g., an ultracapacitor, an electrolytic capacitor, or high power batteries arranged in parallel. Because the energy storage device 1212 has a relatively high power density, it can be recharged at the opportunity charging station 1210 with minimal time off-route. The first energy storage device 1212 is shown in FIG. 12 as being disposed at the bottom of the vehicle 1200. However, the first energy storage device 1212 can equally be disposed at any other place on the vehicle that is convenient for charging access.

The second energy storage device 1214, shown in FIG. 12 at an end of the vehicle 1200, is utilized to power complementary or auxiliary functions for the vehicle 1200. The second energy storage device 1214 can be sized for varied use cases ranging from partial cycle to multiple cycles, and is typically a high energy density primary type storage element that can be exchanged or swapped for off-vehicle recharging. Just as for the first energy storage device 1212, the location of the energy storage device 1214 as shown in FIG. 12 is only an example. Either energy storage device can be located at different locations of the vehicle 1200 as convenient for its intended purpose. For example, the second energy storage device 1214 can be mounted at a side of the vehicle 1200, rather than at an end; or the second energy storage device 1214 can be mounted internally with provision of an ejector apparatus, for example as discussed in a co-pending application Ser. No. 14/959,424, "Energy Storage Device, Exchange Apparatus, And Method For Exchanging An Energy Storage Device," hereby incorporated herein by reference in its entirety.

In embodiments, the second energy storage device 1214 is exchangeable or "swappable," e.g., externally mounted to the vehicle body in a manner permitting rapid removal from the vehicle body. For example, the second energy storage device 1214 may be externally mounted to the vehicle body by mounting apparatus 1215 that includes at least one of hooks, latches, or retractable fasteners, such that the mounting apparatus can be quickly withdrawn or deactivated or detached by remote command, in order to permit removal of the second energy storage device. In certain embodiments, the second energy storage device 1214 is mounted in such a way that on detachment of the mounting apparatus 1215, the second energy storage device will fall or slide from the vehicle 1200.

In case route scheduling sporadically prevents recharging at the opportunity charging station 1210 (e.g., in case the vehicle 1200 can stop at or pass through the opportunity charging station 1210 only once in two or three transits along the route 1202 and the return route 1208), or in case the vehicle 1200 is required to divert to a sidetrack 1216, the vehicle 1200 is configured so that the energy storage device 1212 can be recharged onboard from the swappable energy storage device 1214, or so that the energy storage device 1214 can provide power directly to the vehicle 1200.

For example, the first and second energy storage devices 1212, 1214 can be connected with an energy management module 1218 that is configured to interconnect the first energy storage device with the second energy storage device via a power bus (not shown). The energy management module 1218 may include one or more controllers (e.g., processors, microcontrollers, computer units), and may alternatively or additionally include a single central component that is mounted in the vehicle body, and/or plural components some of which are assembled modularly with the first and/or second energy storage devices. Thus, portions of the energy management module 1218 may be interchangeable along with the energy storage device(s) that are controlled by those portions of the energy management module. Such an energy management module (for example, one such as that which is disclosed in U.S. Publication No. 2015/0207344A1, dated Jul. 23, 2015, hereby incorporated herein by reference in its entirety) can be configured to select among an energy storage mode of operation, an energy balance mode of operation, and an energy discharge mode of operation. Under the energy storage mode of operation, the energy management module receives electrical current from the power bus of the vehicle and allocates the electrical current among the at least one first energy storage unit and the at least one second energy storage unit. Under the energy balance mode of operation, the energy management module transfers electrical charge among the at least one first energy storage unit and the at least one second energy storage unit.

Under the energy discharge mode of operation, the energy management module delivers electrical current to the power bus of the vehicle from at least one of the at least one first energy storage unit and the at least one second energy storage unit. The energy management module may be configured to transfer electrical charge among the at least one first energy storage unit and the at least one second energy storage unit according to a next anticipated mode of operation. For example, the energy management module may be configured to transfer electrical charge from at least one first energy storage unit to at least one second energy storage unit in anticipation of an energy storage mode of operation. As another example, the energy management module may be configured to transfer electrical charge from at least one second energy storage unit to at least one first energy storage unit in anticipation of an energy discharge mode of operation. The energy management module may be configured to receive a signal indicative of the next anticipated mode of operation. In a particular embodiment, with reference to FIG. 13, the energy management module 1218 can be configured to select 1300 which energy source to use, based on evaluating 1302 whether the vehicle 1200 is on a route approaching an opportunity charging location; if not, then evaluating 1304 whether the vehicle's next route can be selected to include opportunity charging. By default 1306, the energy management module 1218 will run the vehicle 1200 from the first rechargeable energy storage device 1212, however, in case no opportunity charging is expected on the current route, and in case no selectable next route includes an opportunity charging station, then the energy management module 1218 will select 1308 to run/recharge from the second (swappable) energy storage device 1214, and may select a next route that includes a battery swap apparatus, e.g., as shown and described in co-pending application U.S. application Ser. No. 14/699,173, filed Apr. 29, 2015 and entitled "Apparatus and method for automated energy storage device exchange and rapid charging," hereby incorporated herein by reference in its entirety. In this context, "selectable next route" means a next route that is contiguous with the vehicle's presently selected route.

Moreover, in certain embodiments the opportunity charging station 1210 can be provided with a "wireless" recharging apparatus such that the first energy storage device 1212 can be recharged while the vehicle 1200 is in motion under power from the second energy storage device 1214.

The high power density and convenient location of the first energy storage device 1212 enables recharging the first energy storage device at the opportunity charging station 1210, while provision of the swappable, second energy storage device 1214 provides flexibility for a variety of non-typical operating scenarios in which opportunity charging may not be readily available. Additionally, configuration of the opportunity charging station 1210 to provide adaptive/on-demand opportunity charging saves time by permitting recharge of the first energy storage device 1212 during routine operation. Provision of the different types of energy storage devices 1212, 1214 also enhances overall vehicle performance as the second energy storage device 1214 can provide complementary assistance in case the first energy storage device 1212 does not have enough power or energy to sustain operations.

Thus, the vehicle 1200 according to embodiments of the invention can be used in mines where either opportunity charging is available or using energy storage exchanges when the opportunity charging infrastructure is not available. No additional energy source is needed for non-typical vehicle functions, such as when the vehicle needs to be taken to a maintenance depot or a different mining location.

In certain embodiments, hybrid/dual/multiple energy storage devices 1212, 1214 of differing types are provided on-board the vehicle 1200. The first energy storage device 1212 may be a power dense energy storage device using opportunity charging methods, e.g., a power battery, a power ultracapacitor, or a high energy density (>6 Wh/kg) ultracapacitor. The first energy storage device 1212 is used to perform routine functions/operations. The second energy storage device 1214 may be an energy dense energy storage device using energy storage device swap methods for charging/replacement. The second energy storage device 1214 can be sized to cover partial or multiple cycle operation. The second energy storage device 1214 is a complementary or auxiliary power/energy source to the first energy storage device 1212, and is utilized to perform non-routine functions/operations.

With the hybrid/dual/multiple energy storage devices 1212, 1214 on-board, either energy storage device provides power to the vehicle while the other energy storage device is charged/replaced For example, when the first energy storage device 1212 is opportunistically charged, then the second energy storage device 1214 provides power and energy needed for the vehicle. While the second energy storage device 1214 is swapped/replaced, and during routine operations, the first energy storage device 1212 provides power and energy needed for the vehicle. Thus, the second energy storage device 1214 may be replaced while the first energy storage device 1212 is in operation ("hot swap").

Alternatively, the second energy storage device 1214 may be replaced while the first energy storage device 1212 is not in operation or is disconnected from the rest of the power system ("cold swap"). Either or both energy storage devices can provide full or partial power and energy needed during discharge for the vehicle to perform the designed functions.

Therefore, in aspects of the invention, the vehicle 1200 with hybrid/dual/multiple on-board energy storage devices 1212, 1214 is used to transport material or people along a predetermined route 1202 and return route 1208. In certain aspects, the vehicle 1200 may also traverse one or more irregular sidetracks 1216. A sidetrack 1216 may be selected based upon, e.g., presence of traffic or other obstacles along predetermined routes 1202, 1208.

In an embodiment, an apparatus or system includes a vehicle alignment feature, a battery receptacle that is mounted at a pre-defined position relative to the vehicle alignment feature, and a power connector that is mounted to the battery receptacle for operative connection to a battery by receipt of the battery into the battery receptacle.

In an embodiment, an apparatus or system includes a vehicle alignment feature, a battery receptacle that is mounted at a pre-defined position relative to the vehicle alignment feature, a power connector that is mounted to the battery receptacle for operative connection to a battery by receipt of the battery into the battery receptacle, and a catch unit operatively connected to the battery receptacle for releasably securing a battery into the battery receptacle.

In an embodiment, an apparatus or system includes a vehicle alignment feature, a battery receptacle that is mounted at a pre-defined position relative to the vehicle alignment feature, a power connector that is mounted to the battery receptacle for operative connection to a battery by receipt of the battery into the battery receptacle, a catch unit operatively connected to the battery receptacle for releasably securing a battery into the battery receptacle, and a controller operatively connected to the catch unit. The catch unit is operable to release the battery from the battery receptacle in response to receiving a release signal. The controller is configured to send the release signal to the catch unit in response to receiving a battery-engaging signal from a battery exchange apparatus.

In an embodiment, an apparatus or system includes a vehicle alignment feature, a battery receptacle that is mounted at a pre-defined position relative to the vehicle alignment feature, a power connector that is mounted to the battery receptacle for operative connection to a battery by receipt of the battery into the battery receptacle, and a catch unit operatively connected to the battery receptacle for releasably securing a battery into the battery receptacle. The catch unit is operable to secure the battery into the battery receptacle in response to receiving power from the battery via the power connector.

In an embodiment, an apparatus or system includes a vehicle alignment feature, a battery receptacle that is mounted at a pre-defined position relative to the vehicle alignment feature, a power connector that is mounted to the battery receptacle for operative connection to a battery by receipt of the battery into the battery receptacle, and a catch unit operatively connected to the battery receptacle for releasably securing a battery into the battery receptacle. The catch unit is operatively connected to a movable element of the battery receptacle so as to automatically secure the battery upon receipt of the battery into the battery receptacle.

In an embodiment, an apparatus or system includes a vehicle alignment feature, a battery receptacle that is mounted at a pre-defined position relative to the vehicle alignment feature, a power connector that is mounted to the battery receptacle for operative connection to a battery by receipt of the battery into the battery receptacle, and a catch unit operatively connected to the battery receptacle for releasably securing a battery into the battery receptacle. The catch unit includes a movable element that causes the catch unit to release the battery in the event that the battery is engaged by a gripper.

In an embodiment, an apparatus or system includes a vehicle alignment feature, a battery receptacle that is mounted at a pre-defined position relative to the vehicle alignment feature, and a power connector that is mounted to the battery receptacle for operative connection to a battery by receipt of the battery into the battery receptacle. The battery receptacle includes a detent configured to be engaged by a catch unit integrated into a battery, for securing the battery into the battery receptacle.

In an embodiment, an apparatus or system includes a vehicle alignment feature, a battery receptacle that is mounted at a pre-defined position relative to the vehicle alignment feature, and a power connector that is mounted to the battery receptacle for operative connection to a battery by receipt of the battery into the battery receptacle. The battery receptacle defines an insertion area through which the battery can be received into the battery receptacle, and the power connector protrudes toward the insertion area.

In an embodiment, an apparatus or system includes a vehicle alignment feature, a battery receptacle that is mounted at a pre-defined position relative to the vehicle alignment feature, and a power connector that is mounted to the battery receptacle for operative connection to a battery by receipt of the battery into the battery receptacle. The battery receptacle defines an insertion area through which the battery can be received into the battery receptacle, and the power connector protrudes toward the insertion area. The apparatus or system further includes a cover movably mounted across the insertion area, a cover actuator that is operable to remove the cover from the insertion area to make the battery receptacle accessible, and a transponder operatively connected with the cover actuator and configured to operate the cover actuator for opening the battery receptacle in response to a ready signal received from an alignment feature sensing apparatus.

In an embodiment, a system or apparatus includes a battery and a catch unit that is incorporated into the battery and that is configured to secure the battery into a battery receptacle in response to insertion of the battery into the battery receptacle. The catch unit is also configured to release the battery from the battery receptacle in response to receipt of a release signal.

In an embodiment, a system or apparatus includes a battery and a catch unit that is incorporated into the battery and that is configured to secure the battery into a battery receptacle in response to insertion of the battery into the battery receptacle. The catch unit is also configured to release the battery from the battery receptacle in response to receipt of a release signal, and to obtain the release signal by engagement of a gripper against a surface of the battery.

In an embodiment, a method includes moving a vehicle adjacent to a battery exchange apparatus. The vehicle includes a vehicle alignment feature and a battery mounted at a pre-defined position relative to the vehicle alignment feature. The battery exchange apparatus includes an alignment feature sensing apparatus. The method further includes providing a ready signal from the alignment feature sensing apparatus when the vehicle alignment feature is in registration with the alignment feature sensing apparatus, and actuating the battery exchange apparatus to remove the battery from the vehicle in response to the ready signal.

In an embodiment, a method includes moving a vehicle adjacent to a battery exchange apparatus. The vehicle includes a vehicle alignment feature and a battery mounted at a pre-defined position relative to the vehicle alignment feature. The battery exchange apparatus includes an alignment feature sensing apparatus. The method further includes providing a ready signal from the alignment feature sensing apparatus when the vehicle alignment feature is in registration with the alignment feature sensing apparatus, actuating the battery exchange apparatus to remove the battery from the vehicle in response to the ready signal, and making the battery accessible for removal from the vehicle in response to the ready signal.

In an embodiment, a method includes moving a vehicle adjacent to a battery exchange apparatus. The vehicle includes a vehicle alignment feature and a battery mounted at a pre-defined position relative to the vehicle alignment feature. The battery exchange apparatus includes an alignment feature sensing apparatus. The method further includes providing a ready signal from the alignment feature sensing apparatus when the vehicle alignment feature is in registration with the alignment feature sensing apparatus, actuating the battery exchange apparatus to remove the battery from the vehicle in response to the ready signal, and making the battery accessible for removal from the vehicle in response to the ready signal. Removing the battery is accomplished by one of: dropping the battery out the bottom of the stored energy vehicle; ejecting the battery sideways or upward from the stored energy vehicle; depositing the battery on a surface using a manipulator of the stored energy vehicle; or gripping and removing the battery from the stored energy vehicle.

In an embodiment, a method includes moving a vehicle adjacent to a battery exchange apparatus. The vehicle includes a vehicle alignment feature and a battery mounted at a pre-defined position relative to the vehicle alignment feature. The battery exchange apparatus includes an alignment feature sensing apparatus. The method further includes providing a ready signal from the alignment feature sensing apparatus when the vehicle alignment feature is in registration with the alignment feature sensing apparatus, actuating the battery exchange apparatus to remove the battery from the vehicle in response to the ready signal, and making the battery accessible for removal from the vehicle in response to the ready signal. Removing the battery includes removing the battery while the stored energy vehicle is performing an unloaded backhaul transit.

In an embodiment, a method includes moving a vehicle adjacent to a battery exchange apparatus. The vehicle includes a vehicle alignment feature and a battery mounted at a pre-defined position relative to the vehicle alignment feature. The battery exchange apparatus includes an alignment feature sensing apparatus. The method further includes providing a ready signal from the alignment feature sensing apparatus when the vehicle alignment feature is in registration with the alignment feature sensing apparatus, and actuating the battery exchange apparatus to remove the battery from the vehicle in response to the ready signal. Removing the battery includes removing the battery while the stored energy vehicle is waiting to access a work location.

In an embodiment, a method includes moving a vehicle adjacent to a battery exchange apparatus. The vehicle includes a vehicle alignment feature and a battery mounted at a pre-defined position relative to the vehicle alignment feature. The battery exchange apparatus includes an alignment feature sensing apparatus. The method further includes providing a ready signal from the alignment feature sensing apparatus when the vehicle alignment feature is in registration with the alignment feature sensing apparatus, actuating the battery exchange apparatus to remove the battery from the vehicle in response to the ready signal, and mechanically removing the battery from the stored energy vehicle, and mechanically installing a replacement battery into the stored energy vehicle.

In an embodiment, a method includes moving a vehicle adjacent to a battery exchange apparatus. The vehicle includes a vehicle alignment feature and a battery mounted at a pre-defined position relative to the vehicle alignment feature. The battery exchange apparatus includes an alignment feature sensing apparatus. The method further includes providing a ready signal from the alignment feature sensing apparatus when the vehicle alignment feature is in registration with the alignment feature sensing apparatus, actuating the battery exchange apparatus to remove the battery from the vehicle in response to the ready signal, and mechanically removing the battery from the stored energy vehicle, mechanically installing a replacement battery into the stored energy vehicle, and moving the stored energy vehicle between removing the battery and installing the replacement battery. Mechanically installing the replacement battery may be (i) accomplished while the stored energy vehicle is in motion and/or (ii) accomplished by one of: dropping the replacement battery into the stored energy vehicle; pushing the replacement battery into the stored energy vehicle; or lifting the replacement battery into the stored energy vehicle.

In an embodiment, a system (e.g., vehicle battery/charging system) includes an energy management module, a first rechargeable energy storage device configured for mounting to a vehicle body of a vehicle having a motor and connecting to supply power to the vehicle via the energy management module, and a second energy storage device configured for mounting to the vehicle body and connecting to supply power to the vehicle via the energy management module. The energy management module is configured for mounting to the vehicle body and to power the vehicle including the motor from the first rechargeable energy storage device during execution of a routine operation, and from the second energy storage device in a first mode during recharging of the first rechargeable energy storage device and in a second mode during execution of a non-routine operation.

In an embodiment, a system (e.g., vehicle battery/charging system) includes an energy management module, a first rechargeable energy storage device configured for mounting to a vehicle body of a vehicle having a motor and connecting to supply power to the vehicle via the energy management module, and a second energy storage device configured for mounting to the vehicle body and connecting to supply power to the vehicle via the energy management module. The energy management module is configured for mounting to the vehicle body and to power the vehicle including the motor from the first rechargeable energy storage device during execution of a routine operation, and from the second energy storage device in a first mode during recharging of the first rechargeable energy storage device and in a second mode during execution of a non-routine operation. The second energy storage device is configured to be externally mounted to the vehicle body. For example, the second energy storage device may include at least one of hooks, latches, or retractable fasteners for external mounting to the vehicle body.

In an embodiment, a system (e.g., vehicle battery/charging system) includes an energy management module, a first rechargeable energy storage device configured for mounting to a vehicle body of a vehicle having a motor and connecting to supply power to the vehicle via the energy management module, and a second energy storage device configured for mounting to the vehicle body and connecting to supply power to the vehicle via the energy management module. The energy management module is configured for mounting to the vehicle body and to power the vehicle including the motor from the first rechargeable energy storage device during execution of a routine operation, and from the second energy storage device in a first mode during recharging of the first rechargeable energy storage device and in a second mode during execution of a non-routine operation. The second energy storage device is configured to be externally mounted to the vehicle body. The second energy storage device is configured for mounting to the vehicle body by a mounting apparatus, and to be positioned such that on detachment of the mounting apparatus, the second energy storage device will fall or slide from the vehicle body.

In an embodiment, a system (e.g., vehicle battery/charging system) includes an energy management module, a first rechargeable energy storage device configured for mounting to a vehicle body of a vehicle having a motor and connecting to supply power to the vehicle via the energy management module, and a second energy storage device configured for mounting to the vehicle body and connecting to supply power to the vehicle via the energy management module. The energy management module is configured for mounting to the vehicle body and to power the vehicle including the motor from the first rechargeable energy storage device during execution of a routine operation, and from the second energy storage device in a first mode during recharging of the first rechargeable energy storage device and in a second mode during execution of a non-routine operation. The second energy storage device is configured to be externally mounted to the vehicle body. The second energy storage device is configured for mounting to the vehicle body by a mounting apparatus that is disengageable from the second energy storage device by a single removing motion of the second energy storage device.

In an embodiment, a system (e.g., vehicle battery/charging system) includes an energy management module, a first rechargeable energy storage device configured for mounting to a vehicle body of a vehicle having a motor and connecting to supply power to the vehicle via the energy management module, and a second energy storage device configured for mounting to the vehicle body and connecting to supply power to the vehicle via the energy management module. The energy management module is configured for mounting to the vehicle body and to power the vehicle including the motor from the first rechargeable energy storage device during execution of a routine operation, and from the second energy storage device in a first mode during recharging of the first rechargeable energy storage device and in a second mode during execution of a non-routine operation. The energy management module is configured to recharge the first energy storage device from the second energy storage device, in response to the vehicle following a route that does not include an opportunity charging station.

In an embodiment, a system (e.g., vehicle battery/charging system) includes an energy management module, a first rechargeable energy storage device configured for mounting to a vehicle body of a vehicle having a motor and connecting to supply power to the vehicle via the energy management module, and a second energy storage device configured for mounting to the vehicle body and connecting to supply power to the vehicle via the energy management module. The energy management module is configured for mounting to the vehicle body and to power the vehicle including the motor from the first rechargeable energy storage device during execution of a routine operation, and from the second energy storage device in a first mode during recharging of the first rechargeable energy storage device and in a second mode during execution of a non-routine operation. The energy management module is configured to recharge the first energy storage device from the second energy storage device, in response to the vehicle following a route that does not include an opportunity charging station. The energy management module is configured to recharge the first energy storage device from the second energy storage device, only in case the vehicle cannot select a next route that does include an opportunity charging station.

In an embodiment, a system (e.g., vehicle battery/charging system) includes an energy management module, a first rechargeable energy storage device configured for mounting to a vehicle body of a vehicle having a motor and connecting to supply power to the vehicle via the energy management module, and a second energy storage device configured for mounting to the vehicle body and connecting to supply power to the vehicle via the energy management module. The energy management module is configured for mounting to the vehicle body and to power the vehicle including the motor from the first rechargeable energy storage device during execution of a routine operation, and from the second energy storage device in a first mode during recharging of the first rechargeable energy storage device and in a second mode during execution of a non-routine operation. The energy management module is configured to recharge the first energy storage device from the second energy storage device, in response to receiving a signal that indicates the vehicle will divert to a route that does not include an opportunity charging station.

In an embodiment, a system (e.g., vehicle battery/charging system) includes an energy management module, a first rechargeable energy storage device configured for mounting to a vehicle body of a vehicle having a motor and connecting to supply power to the vehicle via the energy management module, and a second energy storage device configured for mounting to the vehicle body and connecting to supply power to the vehicle via the energy management module. The energy management module is configured for mounting to the vehicle body and to power the vehicle including the motor from the first rechargeable energy storage device during execution of a routine operation, and from the second energy storage device in a first mode during recharging of the first rechargeable energy storage device and in a second mode during execution of a non-routine operation. The first energy storage device may comprise a electrochemical battery, or a rechargeable power ultracapacitor with energy density in excess of 6 Wh/kg. The second energy storage device may comprise a metal-air battery or a fuel cell.

In an embodiment, a system (e.g., vehicle battery/charging system) includes a vehicle body, a motor mounted to the vehicle body, a first rechargeable energy storage device mounted to the vehicle body and connected to supply power to the vehicle via an energy management module, and a second energy storage device mounted to the vehicle body and connected to supply power to the vehicle via the energy management module. The energy management module is mounted to the vehicle body and connected and configured to power the vehicle including the motor from the first rechargeable energy storage device during execution of a routine operation and from the second energy storage device during a first mode of recharging of the first rechargeable energy storage device and a second mode during execution of a non-routine operation.

In an embodiment, a method includes selecting a route for a vehicle, operating the vehicle along the route from a rechargeable battery if the selected route includes an opportunity charging station, selecting a next route that does include an opportunity charging station if the selected route does not include an opportunity charging station, and operating the vehicle along the selected route from a swappable battery in the event that (i) the selected route does not include an opportunity charging station and (ii) there is no selectable next route that includes an opportunity charging station.

In an embodiment, a method includes selecting a route for a vehicle, operating the vehicle along the route from a rechargeable battery if the selected route includes an opportunity charging station, selecting a next route that does include an opportunity charging station if the selected route does not include an opportunity charging station, and operating the vehicle along the selected route from a swappable battery in the event that (i) the selected route does not include an opportunity charging station and (ii) there is no selectable next route that includes an opportunity charging station. Operating the vehicle along the route from the swappable battery is done only in case the next route does not include an opportunity charging station.

In an embodiment, a method includes selecting a route for a vehicle, operating the vehicle along the route from a rechargeable battery if the selected route includes an opportunity charging station, selecting a next route that does include an opportunity charging station if the selected route does not include an opportunity charging station, and operating the vehicle along the selected route from a swappable battery in the event that (i) the selected route does not include an opportunity charging station and (ii) there is no selectable next route that includes an opportunity charging station. Operating the vehicle along the route from the swappable battery is done only in case the next route does not include an opportunity charging station. The method further includes, in case the vehicle is operated along the selected route from a swappable battery, selecting a next route that includes a battery swap apparatus.

In an embodiment, a method includes selecting a route for a vehicle, operating the vehicle along the route from a rechargeable battery if the selected route includes an opportunity charging station, selecting a next route that does include an opportunity charging station if the selected route does not include an opportunity charging station, operating the vehicle along the selected route from a swappable battery in the event that (i) the selected route does not include an opportunity charging station and (ii) there is no selectable next route that includes an opportunity charging station, and, in case the selected route includes an opportunity charging station, recharging an energy storage device of the vehicle while the vehicle moves through the opportunity charging station.

In an embodiment, a method includes selecting a route for a vehicle, operating the vehicle along the route from a rechargeable battery if the selected route includes an opportunity charging station, selecting a next route that does include an opportunity charging station if the selected route does not include an opportunity charging station, operating the vehicle along the selected route from a swappable battery in the event that (i) the selected route does not include an opportunity charging station and (ii) there is no selectable next route that includes an opportunity charging station, and selecting a next route according to a state of charge of the rechargeable battery.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. As used herein, the terms "including" and "in which" are used as the plain-English equivalents of the respective terms "comprising" and "wherein." Moreover, terms such as "first," "second," "third," "upper," "lower," "bottom," "top," etc. are used merely as labels, and are not intended to impose numerical or positional requirements on their objects. Further, limitations are not written in means-plus-function format and are not intended to be interpreted based on 35 U.S.C. §112, sixth paragraph, unless and until such limitations expressly use the phrase "means for" followed by a statement of function void of further structure.

This written description uses examples to disclose several embodiments of the invention, including the best mode, and also to enable one of ordinary skill in the art to practice embodiments of the invention, including making and using any devices or systems and performing any incorporated methods. As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
   a base;
   a gripper;
   a retrieval actuator that retractably and extensibly connects the gripper to the base; and
   a vehicle alignment feature sensing apparatus that is operatively connected at least with the retrieval actuator and is configured to cause extension of the retrieval actuator to a battery-engaging position of the gripper in response to registration of a vehicle alignment feature to the vehicle alignment feature sensing apparatus, and to cause retraction of the retrieval actuator to a battery-removing position of the gripper in response to latching engagement of the gripper with a battery that is mounted in a vehicle at a pre-defined location relative to the vehicle alignment feature that is in registration to the alignment feature sensing apparatus.

2. The system of claim 1, wherein the gripper comprises a platform configured for engaging a first surface of the battery that is mounted in the vehicle, and includes at least one protrusion from the platform that is configured for engaging a second surface of the battery that is mounted in the vehicle when the platform engages the first surface of the battery.

3. The system of claim 1, wherein the gripper comprises a latch unit that is operatively connected with at least one contact sensor, that is configured to latchingly engage the gripper with the battery when the at least one contact sensor confirms the battery-engaging position of the gripper, and that is configured to cause retraction of the retrieval actuator upon latched engagement of the gripper with the battery.

4. The system of claim 1, further configured to send a battery-engaging signal to a vehicle battery catch controller, when the retrieval actuator is at its battery-engaging position.

5. The system of claim 1, further configured to send a ready signal to a vehicle traction system for maintaining the vehicle at a constant velocity while the retrieval actuator extends to its battery-engaging position.

6. The system of claim 5, further configured to send a completion signal to the vehicle traction system for permitting vehicle acceleration when the retrieval actuator has been retracted to its battery-removing position.

7. The system of claim 1, further comprising a lateral actuator configured to move the gripper along a direction perpendicular to the extension and retraction of the retrieval actuator, wherein the alignment feature sensing apparatus is operatively connected to adjust the lateral actuator according to a lateral misalignment of the vehicle alignment feature from the alignment feature sensing apparatus.

8. The system of claim 1, further comprising a swivel actuator configured to rotate the gripper around an axis parallel to the extension and retraction of the retrieval actuator, wherein the alignment feature sensing apparatus is operatively connected to adjust the swivel actuator according to an angular misalignment of the vehicle alignment feature from the alignment feature sensing apparatus.

9. The system of claim 1, further comprising a housing in which the base, the gripper, and the retrieval actuator are mounted, the housing having a retrieval opening through which the retrieval actuator is configured to extend and retract the gripper, and further comprising a cover movably mounted across the retrieval opening, and a cover actuator operable to move the cover for opening or closing the housing, wherein the alignment feature sensing apparatus is operatively connected to actuate the cover actuator for opening the housing in response to registration of the vehicle alignment feature to the alignment feature sensing apparatus.

10. The system of claim 1, wherein the vehicle alignment feature is disposed on at least one surface affixed to the base, the alignment feature sensing apparatus is disposed on a vehicle movable relative to the base, and the alignment feature sensing apparatus is operatively connected with the retrieval actuator via a wireless connection.

11. A system comprising:
an energy management module;
a first rechargeable energy storage device configured for mounting to a vehicle body of a vehicle having a motor and connecting to supply power to the vehicle via the energy management module; and
a second energy storage device configured for mounting to the vehicle body and connecting to supply power to the vehicle via the energy management module;
wherein the energy management module is configured for mounting to the vehicle body and to power the vehicle including the motor from the first rechargeable energy storage device during execution of a routine operation, and from the second energy storage device in a first mode during recharging of the first rechargeable energy storage device and in a second mode during execution of a non-routine operation.

12. The system of claim 11, wherein the second energy storage device is configured to be externally mounted to the vehicle body.

13. The system of claim 12, wherein the second energy storage device includes at least one of hooks, latches, and retractable fasteners for external mounting to the vehicle body.

14. The system of claim 12, wherein the second energy storage device is configured for mounting to the vehicle body by a mounting apparatus, and to be positioned such that on detachment of the mounting apparatus, the second energy storage device will fall or slide from the vehicle body.

15. The system of claim 12, wherein the second energy storage device is configured for mounting to the vehicle body by a mounting apparatus that is disengageable from the second energy storage device by a single removing motion of the second energy storage device.

16. The system of claim 11, wherein the energy management module is configured to recharge the first energy storage device from the second energy storage device, in response to the vehicle following a route that does not include an opportunity charging station.

17. The system of claim 16, wherein the energy management module is configured to recharge the first energy storage device from the second energy storage device, only in case the vehicle cannot select a next route that does include an opportunity charging station.

18. The system of claim 11, wherein the energy management module is configured to recharge the first energy storage device from the second energy storage device, in response to receiving a signal that indicates the vehicle will divert to a route that does not include an opportunity charging station.

19. The system of claim 11, wherein the first energy storage device is an electrochemical battery, and the first energy storage device is a rechargeable power ultracapacitor with energy density in excess of 6 Wh/kg.

20. A system comprising:
a vehicle body;
a motor mounted to the vehicle body;
a first rechargeable energy storage device mounted to the vehicle body and connected to supply power to the vehicle via an energy management module; and
a second energy storage device mounted to the vehicle body and connected to supply power to the vehicle via the energy management module;
wherein the energy management module mounted to the vehicle body and connected and configured to power the vehicle including the motor from the first rechargeable energy storage device during execution of a routine operation and from the second energy storage device during a first mode of recharging of the first rechargeable energy storage device and a second mode during execution of a non-routine operation.

* * * * *